DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 278

T904,034

PHOTOGRAPHIC EMULSIONS

Derek David Chapman, % Eastman Kodak Co., Kodak Park Division, 1999 Lake Ave., Rochester, N.Y. 14650

Filed June 26, 1972, Ser. No. 266,190

Int. Cl. G03c *1/16, 1/36*

U.S. Cl. 96—100

No Drawing. 33 Pages Specification

Silver halide emulsions are provided, which feature certain cyanine and merocyanine dyes containing a 3 or 5 position pyrazole nucleus. The dyes are outstanding electron acceptors and spectral sensitizers in direct positive type photographic silver halide emulsions. They provide superior reversal systems, especially with fogged silver halide emulsions that are characterized by good speed with maximum sensitivity occurring in the region of from about 440 to 580 nm.